United States Patent Office 2,727,863
Patented Dec. 20, 1955

2,727,863

METHOD OF PREPARATION OF THALLIUM ACTIVATED POTASSIUM IODIDE

Gorton R. Fonda, Schenectady, N. Y., assignor to General Electric Company, a corporation of New York No Drawing. Application November 30, 1950, Serial No. 198,474

4 Claims. (Cl. 252—301.4)

This invention relates to luminescent materials. More particularly, it relates to luminescent materials which are sensitive to gamma ray and X-ray radiation and whose brightness under such excitation may be used as an indication or measure of the intensity of such radiation.

It has been known heretofore that thick crystals of certain organic materials, such as naphthalene, and certain inorganic materials, such as scheelite ($CaWO_4$), luminesce brightly when subjected to high intensity radiation such as that which is characteristic of gamma rays and X-rays. It is believed that the superior luminescence exhibited by such materials is attributable to their thickness and translucence, the thickness permitting the effective absorption of the exciting radiation and their translucence permitting the transmission of the luminescence throughout the mass with a resultant enhanced luminescent effect.

In general, synthetic, luminescent materials are not adaptable to such use because their finely crystalline structure renders them essentially opaque when they are prepared in any appreciable thickness or more than several crystals thick. Such thick, finely crystallized layers are characterized by excessive scattering and consequent loss of fluorescent light among the crystals, and the only effective light available for indicating use is that produced near the surface of the layer or screen.

It is an object of this invention to provide useful synthetic, luminescent structures which may be prepared in relatively thick, translucent layers.

Another object of the present invention is to provide such synthetic, luminescent materials whose luminescent brightness under high intensity radiation may be used to indicate the intensity of such radiation.

A further object of the invention is to provide synthetic, translucent, luminescent materials which may be utilized to indicate the intensity of gamma ray and X-ray radiation. Other objects will become apparent from the following description.

While, in general, synthetic phosphors or luminescent bodies, when provided in any appreciable thickness, are too opaque to be useful in measuring high intensity radiation, it has been found that thallous iodide activated potassium iodide is very adaptable to such use and is superior in this respect to such organic materials as naphthalene and to naturally occurring materials such as scheelite.

It has further been found that the above material may be fused without losing its luminescence and prepared in a wide range of thicknesses. Amorphous material prepared according to the present invention retains its useful translucence in thicknesses up to over several centimeters with the result that an appreciable amount of the luminescence excited within its interior is transmitted for detection. The translucent quality of the material is enhanced by rapid cooling after fusion to retain the melt in the form of a semi-glass or supercooled liquid.

The quantity of thallous iodide activator used depends upon the emission which is desired. When a bluish emission or one of relatively short wavelength is desired, from 0.02 per cent to one per cent of activator, based on the weight of the potassium iodide, are added to the original mixture. Good results are obtained when 0.1 to 0.3 per cent and, particularly, 0.2 per cent by weight of activator is used. When an emission which is displaced toward the red end of the spectrum is indicated, up to about 30 per cent by weight of thallous iodide is added.

The present luminescent material is very readily prepared. The potassium iodide and thallous iodide are mixed and ground together, preferably in the dry state, by any convenient means, as in a mortar. The mixture is then placed in a suitable container and heated to the point of fusion. This temperature varies from about 723° C., which is the melting point of potassium iodide, downward depending upon the amount of thallous iodide added. During the fusion process certain amounts, up to one-half in some cases, of the thallous iodide evaporate. Thus, the final luminescent material will contain from one-half to about the same amount of thallous iodide as that originally added.

After fusion, the material is poured and cooled to form layers. Preferably the cooling is carried out rapidly since this improves the translucent quality of the material. Layers one millimeter thick poured on a heavy metal plate at or below room temperature are solidified in less than one second. Layers about one centimeter thick solidify in about one minute when poured on a slab maintained at room temperature.

While integral layers of the present material up to and over twenty millimeters thick have been prepared which are useful in the detection and measurement of high intensity radiation, it is preferable where large thicknesses are required, to build up a structure of thinner, more rapidly cooled laminae. In this manner the greater translucence and better detection qualities of the thinner layers may be used to the fullest extent. For example, the structure may conveniently be built up of layers about one millimeter thick.

There are provided by the present invention, amorphous, synthetic, luminescent materials which may be used to detect and measure high intensity radiation such as that of gamma rays and X-rays. The brightness of luminescence is substantially greater than that afforded by prior art materials such as naphthalene and scheelite.

What I claim as new and desire to secure by Letters Patent of the United States is:

1. The method of preparing a translucent gamma ray and X-ray sensitive luminescent material which comprises adding to potassium iodide from about 0.02 per cent to one per cent thallous iodide based on the weight of the potassium iodide, heating the material to the fusion temperature thereof and casting a layer of the fused material by pouring the fused material onto the surface of a relatively cool body of good heat conductivity to cool rapidly said material.

2. The method of preparing a gamma ray and X-ray sensitive luminescent material which comprises adding to potassium iodide from about 0.1 per cent to 0.3 per cent thallous iodide based on the weight of the potassium iodide, heating the material to the fusion temperature thereof and casting a layer of the fused material by pouring the fused material onto the surface of a relatively cool body of good heat conductivity to cool rapidly said material.

3. The method of preparing a gamma ray and X-ray sensitive luminescent material which comprises adding to potassium iodide 0.2 per cent thallous iodide based on the weight of the potassium iodide, heating the material to the fusion temperature thereof and casting a layer of the fused material by pouring the fused material onto the surface of a relatively cool body of good heat conductivity to cool rapidly said material.

4. The method of preparing a gamma ray and X-ray sensitive luminescent material which comprises adding to potassium iodide from .02 to about thirty per cent thallous iodide based on the weight of the potassium iodide, heating the material to the fusion temperature thereof and casting a layer of the fused material by pouring the fused material onto the surface of a relatively cool body of good heat conductivity to cool rapidly said material.

References Cited in the file of this patent

UNITED STATES PATENTS

| | | |
|---|---|---|
| 2,585,551 | Hofstadter | Feb. 12, 1952 |

FOREIGN PATENTS

| | | |
|---|---|---|
| 492,722 | Great Britain | Sept. 26, 1938 |

OTHER REFERENCES

"Nucleonics," April 1949, article by Hofstadter, "Crystal Counters," pp. 18–21.

Reprint from Proc. of I. R. E., vol. 37, No. 6, June 1949, article by Coltman, "The Scintillation Counter," pp. 674, 675.